United States Patent
Oguchi (10) Patent No.: US 8,327,291 B2
(45) Date of Patent: Dec. 4, 2012

(54) ON-VEHICLE DISPLAY DEVICE AND DISPLAY METHOD ADOPTED IN ON-VEHICLE DISPLAY DEVICE

(75) Inventor: Junko Oguchi, Yamato (JP)

(73) Assignee: Xanavi Informatics Corporation, Zama-shi (JP)

(*) Notice: Subject to any disclaimer, the term of this patent is extended or adjusted under 35 U.S.C. 154(b) by 1211 days.

(21) Appl. No.: 11/819,929

(22) Filed: Jun. 29, 2007

(65) Prior Publication Data

US 2008/0052627 A1    Feb. 28, 2008

(30) Foreign Application Priority Data

Jul. 6, 2006 (JP) ................. 2006-186259

(51) Int. Cl.
*G06F 3/048* (2006.01)
*G06F 3/041* (2006.01)
(52) U.S. Cl. ... 715/790; 715/851; 345/173; 348/E5.047; 348/E5.099; 348/E5.105
(58) Field of Classification Search .......... 715/790, 715/851; 348/E5.047, E5.099, E5.105; 345/173; 701/11
See application file for complete search history.

(56) References Cited

U.S. PATENT DOCUMENTS

| 5,757,359 A * | 5/1998 | Morimoto et al. | 345/156 |
|---|---|---|---|
| 5,961,570 A * | 10/1999 | Inamori | 701/538 |
| 5,982,352 A * | 11/1999 | Pryor | 345/156 |
| 6,359,612 B1 * | 3/2002 | Peter et al. | 345/156 |
| 6,501,515 B1 * | 12/2002 | Iwamura | 348/734 |
| 6,650,384 B2 * | 11/2003 | Oguchi et al. | 349/86 |
| 7,259,747 B2 * | 8/2007 | Bell | 345/156 |
| 7,397,463 B1 * | 7/2008 | Kishi et al. | 345/173 |
| 7,509,588 B2 * | 3/2009 | Van Os et al. | 715/835 |
| 7,567,222 B2 * | 7/2009 | Tanaka et al. | 345/7 |
| 7,634,356 B2 * | 12/2009 | Oguchi et al. | 701/416 |
| 7,969,423 B2 * | 6/2011 | Kawabe | 345/173 |
| 8,077,970 B2 * | 12/2011 | Ishikawa | 382/181 |
| 8,102,381 B2 * | 1/2012 | Kimura | 345/173 |
| 2003/0006892 A1 * | 1/2003 | Church | 340/439 |
| 2003/0220725 A1 * | 11/2003 | Harter et al. | 701/36 |

(Continued)

FOREIGN PATENT DOCUMENTS

CN        2509644 Y        9/2002

(Continued)

OTHER PUBLICATIONS

Jorg Baus, A Resource-Adaptive Mobile Navigation System, 2002.*

(Continued)

*Primary Examiner* — Boris Pesin
*Assistant Examiner* — Ece Hur
(74) *Attorney, Agent, or Firm* — Crowell & Moring LLP (57) ABSTRACT

An on-vehicle display device includes: an image generation unit that generates a first image that can be viewed from a driver's seat side and a second image that can be viewed from a passenger's seat side; and a display monitor at which the first image and the second image are displayed within a screen, and the image generation unit does not include an image of an icon or a button, operation of which by a driver is restricted, in the first image, includes the image of the icon or the button in the second image, and constantly changes a display position of the icon or the button in the second image.

7 Claims, 7 Drawing Sheets

U.S. PATENT DOCUMENTS

| | | | |
|---|---|---|---|
| 2004/0243306 A1* | 12/2004 | Han | 701/211 |
| 2005/0267676 A1* | 12/2005 | Nezu et al. | 701/200 |
| 2006/0053301 A1* | 3/2006 | Shin | 713/183 |
| 2007/0182721 A1* | 8/2007 | Watanabe et al. | 345/173 |
| 2008/0068284 A1* | 3/2008 | Watanabe et al. | 345/1.1 |
| 2008/0168403 A1* | 7/2008 | Westerman et al. | 715/863 |
| 2008/0229210 A1* | 9/2008 | Bamba | 715/740 |
| 2009/0013261 A1* | 1/2009 | Noda et al. | 715/750 |
| 2009/0021491 A1* | 1/2009 | Kawamura | 345/173 |
| 2009/0058845 A1* | 3/2009 | Fukuda et al. | 345/214 |
| 2009/0284474 A1* | 11/2009 | Komaki et al. | 345/173 |
| 2009/0313561 A1* | 12/2009 | Friedlander et al. | 715/764 |
| 2010/0010365 A1* | 1/2010 | Terao et al. | 600/544 |
| 2010/0060722 A1* | 3/2010 | Bell | 348/51 |
| 2010/0082437 A1* | 4/2010 | Tamayama et al. | 705/14.58 |
| 2011/0022310 A1* | 1/2011 | Ishii et al. | 701/208 |
| 2011/0060499 A1* | 3/2011 | Suzuki | 701/36 |
| 2011/0063236 A1* | 3/2011 | Arai et al. | 345/173 |

FOREIGN PATENT DOCUMENTS

| | | | |
|---|---|---|---|
| JP | 9-54862 A | | 2/1997 |
| JP | 2000-137443 A | | 5/2000 |
| JP | 2000-346651 A | | 12/2000 |
| JP | 2005055611 | * | 1/2003 |
| JP | 2004-318515 A | | 11/2004 |
| JP | 2005-55611 A | | 3/2005 |
| JP | 2005-284592 A | | 10/2005 |
| JP | 2006-131227 A | | 5/2006 |
| JP | 2006292656 A | * | 10/2006 |
| WO | WO 2007/141941 A1 | | 12/2007 |

OTHER PUBLICATIONS

Verena, Broy, "iFlip: A Metaphor for In-vehicle Information Systems", 2006.*

Chinese Office Action dated Oct. 9, 2009 (English language) (seven (7) pages).

* cited by examiner

USER OCCUPYING
PASSENGER'S SEAT

USER OCCUPYING
DRIVER'S SEAT

FIG. 7

ON-VEHICLE DISPLAY DEVICE AND DISPLAY METHOD ADOPTED IN ON-VEHICLE DISPLAY DEVICE

INCORPORATION BY REFERENCE

The disclosure of the following priority application is herein incorporated by reference:
Japanese Patent Application No. 2006-186259 filed Jul. 6, 2006

BACKGROUND OF THE INVENTION

1. Field of the Invention

The present invention relates to an on-vehicle display device that can be operated by pressing buttons or icons displayed at the display device and a display method to be adopted in the on-vehicle display device.

2. Description of Related Art

There are display devices known in the related art that conceal menu buttons, the operation of which by the driver driving the vehicle is restricted, by using a so-called view angle shutter (see, for instance, Japanese Laid Open Patent Publication No. 2005-55611).

SUMMARY OF THE INVENTION

There is a concern that once the driver, driving a vehicle equipped with the display device in the related art disclosed in Japanese Laid Open Patent Publication No. 2005-55611, learns the button display positions, he may operate the buttons even if they are concealed by the view angle shutter.

According to the 1st aspect of the present invention, an on-vehicle display device, comprises: an image generation unit that generates a first image that can be viewed from a driver's seat side and a second image that can be viewed from a passenger's seat side; and a display monitor at which the first image and the second image are displayed within a screen, and the image generation unit does not include an image of an icon or a button, operation of which by a driver is restricted, in the first image, includes the image of the icon or the button in the second image, and constantly changes a display position of the icon or the button in the second image.

According to the 2nd aspect of the present invention, in the on-vehicle display device according to the 1st aspect, it is preferred that the image generation unit changes the display position of the icon or the button randomly.

According to the 3rd aspect of the present invention, in the on-vehicle display device according to the 1st aspect, it is preferred that the image generation unit includes: a first image generation unit that generates a map image; a second image generation unit that generates an image of the icon or the button; and a superimposing unit that superimposes the image of the icon or the button over the map image.

According to the 4th aspect of the present invention, in the on-vehicle display device according to the 1st aspect, it is preferred that the icon or the button, the operation of which by the driver is restricted, is a menu button operated to display a menu screen.

According to the 5th aspect of the present invention, in the on-vehicle display device according to the 1st aspect, it is preferred that the image generation unit generates an image of an icon or a button, the operation of which by the driver is not restricted, in the first image and the second image.

According to the 6th aspect of the present invention, in the on-vehicle display device according to the 1st aspect, it is preferred that: the image generation unit also generates a map image and an image of an icon or a button, the operation of which by the driver is not restricted, includes the map image and the image of the icon or the button, the operation of which by the driver is not restricted in the first image, and includes the map image, the image of the icon or the button, the operation of which by the driver is not restricted and the image of the icon or the button, the operation of which by the driver is restricted in the second image; and the icon or the button, the operation of which by the driver is restricted is a menu button operated to display a menu screen and the icon or the button, the operation of which by the driver is not restricted is a button to be operated to indicate wide area/detailed setting for the map image.

According to the 7th aspect of the present invention, in the on-vehicle display device according to any one of the 1st through 6th aspects, it is preferred that a touch panel that forms a touch switch by interlocking with an icon or a button on display, is disposed over a display screen at the display monitor.

According to the 8th aspect of the present invention, a display method to be adopted in an on-vehicle display device, comprises: generating a first image that can be viewed from a driver's seat side and a second image that can be viewed from a passenger's seat side; generating an image of an icon or a button, operation of which by the driver is restricted; displaying the first image and the second image within a monitor screen so as to allow the first image to be viewed from the driver's seat side and the second image to be viewed from the passenger's seat side; and displaying the icon or the button in the second image alone.

According to the 9th aspect of the present invention, in the display method to be adopted in an on-vehicle display device according to the 8th aspect, it is preferred that: the first image and the second image both include a map image; and an icon or a button other than the icon or the button, the operation of which by the driver is restricted, is superimposed over the map image in the first image, and icons and buttons including the icon or the button the operation of which by the driver is restricted, are superimposed over the map image in the second image.

DESCRIPTION OF PREFERRED EMBODIMENT

Figure 1:
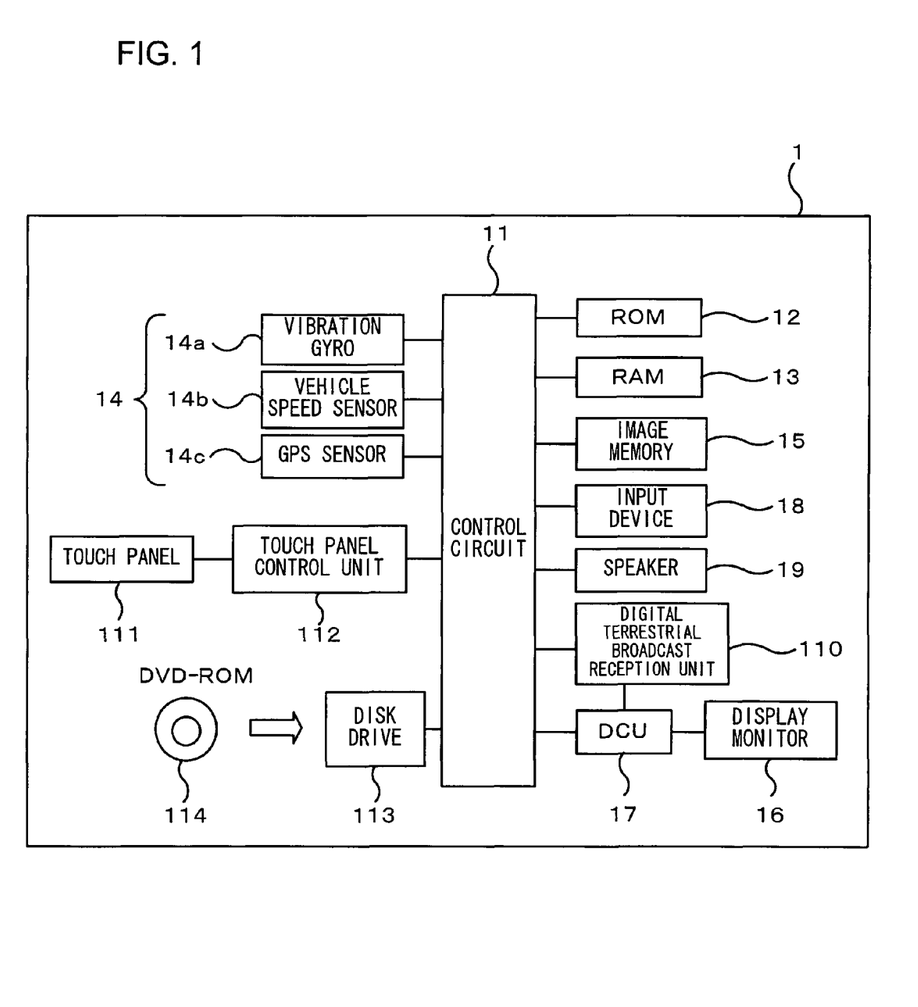
FIG. 1 is a block diagram showing the structure adopted in the navigation system achieved in an embodiment of the present invention.

FIG. 1 shows the navigation system achieved in an embodiment of the present invention. At the navigation system 1 shown in FIG. 1, a driver's seat-side image and a passenger's seat-side image are displayed at a single display monitor 16 so as to allow, for instance, a map of an area around the subject vehicle position to be viewed from the driver's seat side and allow a digital terrestrial broadcast video image to be viewed from the passenger's seat side. The navigation system 1 comprises a control circuit 11, a ROM 12, a RAM 13, a current position detection device 14, an image memory 15, the display monitor 16, a DCU (displayed control unit) 17, an input device 18, a speaker 19, a digital terrestrial broadcast reception unit 110, a touch panel device 111 and a disk drive 113. A DVD-ROM 114 is loaded in the disk drive 113.

The control circuit 11, constituted with a microprocessor and its peripheral circuits, implements various types of control by using the RAM 13 as its work area as it executes a control program stored in the ROM 12. As the control circuit 11 executes a specific type of route search processing based upon map data stored in the DVD-ROM 114, the processing results are displayed as a recommended route at the display monitor 16.

The current position detection device 14, which detects the current position of the subject vehicle, may be constituted with, for instance, a vibration gyro 14a that detects the vehicle advancing direction, a vehicle speed sensor 14b that detects the vehicle speed, a GPS sensor 14c that detects a GPS signal from a GPS (global positioning system) satellite, and the like. Based upon the current vehicle position detected by the current position detection device 14, the navigation system 1 determines a map display range, a route search start point and the like and indicates the current position on the map.

Image data of a map or the like to be displayed at the display monitor 16 are stored in the image memory 15. The image data, which include roadmap drawing data and various types of graphic data, are generated as needed based upon the map data from the DVD-ROM 114, which are read by the disk drive 113. By using the image data thus generated, the navigation system 1 is able to display a map and the like.

The disk drive 113 reads out map data to be used to display a map at the display monitor 16 from the DVD-ROM 114. The map data include map display data and route search data. The map display data and the route search data include link information and node information pertaining to the roads in the map data. The map display data include a plurality of sets of map data each provided at a specific scaling factor among various scaling factors ranging from wide-area to detailed, and the scaling factor for the map display can be adjusted at a request from the user of the navigation system 1. It is to be noted that the map data may be read out from a recording medium other than the DVD-ROM 114, such as a CD-ROM or a hard disk.

Various types of information including a map of an area around the subject vehicle position are provided as screen display to the user via the display monitor 16 based upon various types of information including the map data. The display monitor 16 also outputs video image information from a digital terrestrial broadcast received at the digital terrestrial broadcast reception unit 110. At the display monitor 16, two display images are displayed. One of the display images can be viewed from the driver's seat side and the other display image can be viewed from the passenger's seat side via an optical separation element 116 (see FIG. 6) disposed at the front surface of a liquid crystal panel 115 (see FIG. 6) at the display monitor 16.

Figure 6:
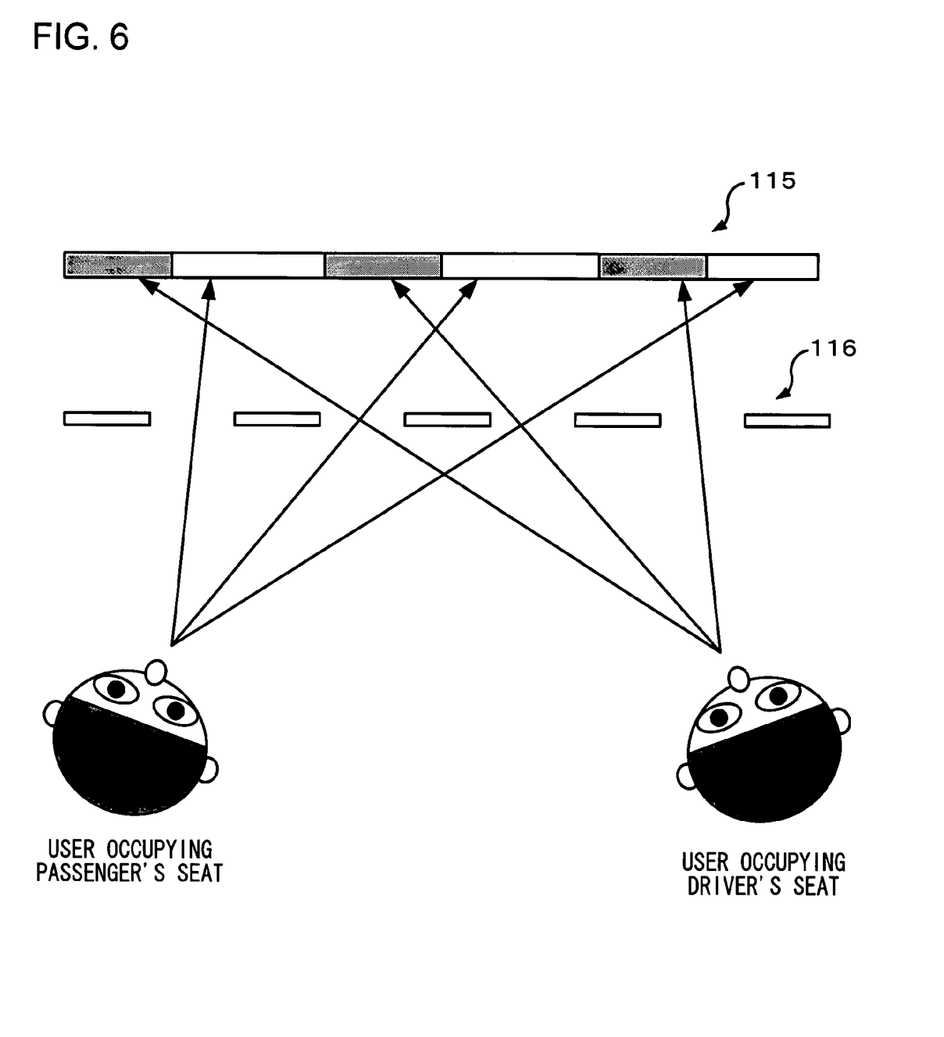
FIG. 6 illustrates the principal based upon which an optical separation element operates.
Figure 7:
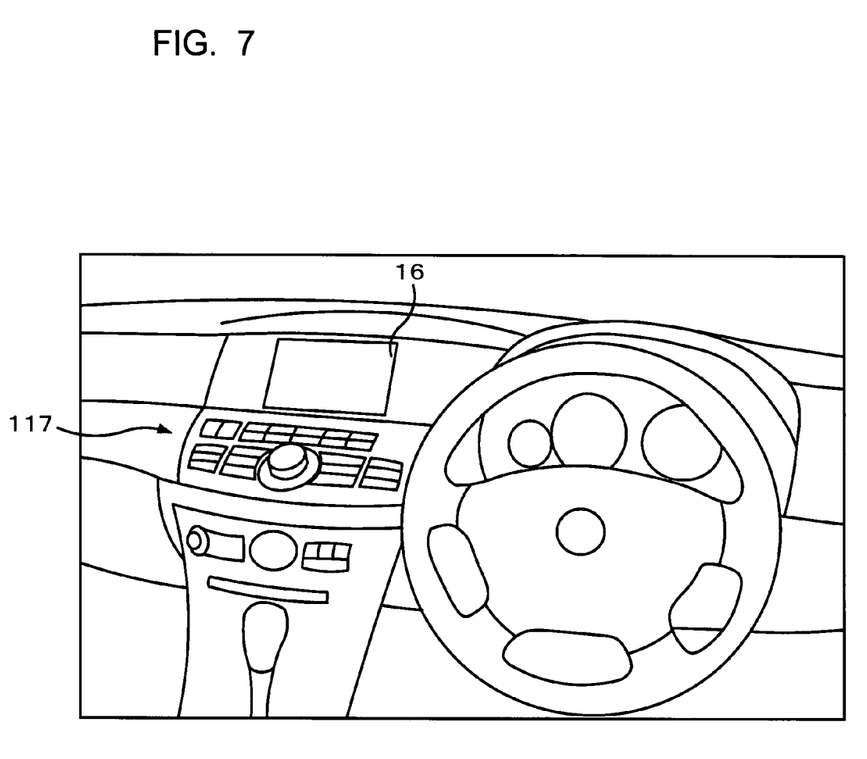
FIG. 7 shows the display monitor installed in a vehicle.

FIG. 6 illustrates the principal based upon which the optical separation element 116 operates. FIG. 7 shows the display monitor 16 installed in a vehicle. The display monitor is installed in a center console 117 located between the driver's seat and the passenger's seat. In FIG. 6, the left side and the right side of the vehicle are indicated along the horizontal direction, whereas the front side of the vehicle is located toward the top of the drawing. At the optical separation element 116, which may include barriers blocking the transmission of light arrayed over predetermined intervals along the longitudinal direction (along the direction perpendicular to the drawing sheet), the liquid crystal dots that are visible at the liquid crystal panel 115 change in correspondence to the viewing angle, i.e., in correspondence to whether the liquid crystal panel is viewed from the left side or the right side. Thus, different dots at the liquid crystal panel 115 can be viewed from the driver's seat side and from the passenger's seat side. Accordingly, display images may be generated in correspondence to the different dots so as to allow one display image to be viewed from the driver's seat side and another display image to be viewed from the passenger's seat side.

The DCU 17 generates icon and button images which are then superimposed over an image such as a map image output from the control circuit 11. The DCU 17 is to be described in detail later.

The input device 18, which includes operation keys operated by the user to set various commands and the like, may be realized as button switches on the operation panel or hardware switches disposed around the panel. The user, prompted by instructions provided on the display screen at the display monitor 16, touches a button switch on the panel with his finger so as to perform a setting operation such as destination selection. Through the speaker 19, audio messages providing the user with operation guidance and route guidance are output. In addition, audio information in a digital terrestrial broadcast received at the digital terrestrial broadcast reception unit 110 is output through the speaker 19.

As a destination is set by the user, the navigation system 1 executes a route calculation based upon a specific algorithm to determine a route to the destination starting from the current position detected via the GPS sensor 14c. The route thus determined (hereafter referred to as a recommended route) is indicated on the screen by adopting a specific display mode that makes it possible to distinguish the route from the other roads, e.g., by using a different display color. As a result, the user is able to recognize the recommended route in the map on display with ease. In addition, the navigation system 1 guides the vehicle so as to enable the vehicle to travel along the recommended route by providing the user with visual cues on the screen or audio instructions along the advancing direction.

The digital terrestrial broadcast reception unit 110 receives a digital terrestrial broadcast and outputs the contents of the received broadcast to the control circuit 11.

The touch panel 111 is a transparent panel disposed over the monitor screen of the display monitor 16 and thus, a display screen brought up at the display monitor 16 is viewed through the touch panel 111. In addition, as the display screen at the display monitor 16 is touched, the touch panel control unit 112 calculates the touch position. As does the input device 18, the touch panel 111 has an input function. As the user touches a map image or a menu, a button, an icon or the like corresponding to a specific function among various functions displayed at the display monitor 16, the touch panel 111 is also touched and, as a result, a destination may be set based upon the touch position or the processing defined by the menu, the button or the icon corresponding to the specific function may be executed. Namely, the touch panel 111 constitutes a touch switch having an input function, which operates by interlocking with the menus, the buttons, the icons and the like on display. It is to be noted that if the occupant of the driver's seat touches the touch panel in an area corresponding to the display position of a menu, a button, an icon or the like that can be viewed only from the passenger's seat side and is invisible from the driver's seat side, the operation corresponding to the menu, the button, the icon or the like is executed in the navigation system in the embodiment.

Figure 2:
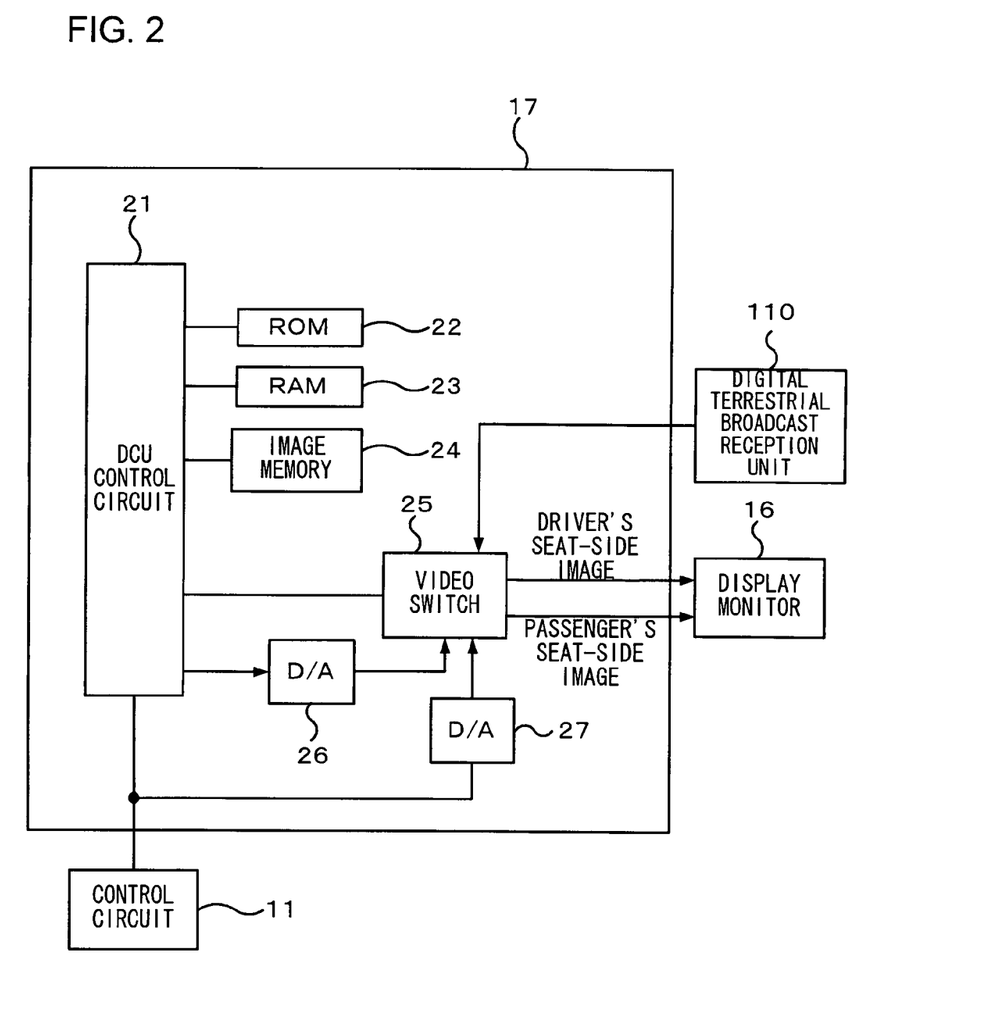
FIG. 2 is a block diagram showing the structure of the DCU (display control unit) achieved in the embodiment of the present invention.

Now, the DCU 17 achieved in the embodiment of the present invention is explained in reference to FIG. 2. The DCU 17 includes a DCU control circuit 21, a ROM 22, a RAM 23, an image memory 24, a video switch 25 and digital-analog converters 26 and 27.

The DCU control circuit 21, which executes overall control of the DCU 17, comprises a microprocessor and its peripheral circuits. The RAM 23 is used as a work area for the DCU control circuit 21 when it implements various types of control by executing a control program stored in the ROM 22. The DCU control circuit 21 generates icon and button images and stores the image data having been generated into the image memory 24. Then, it reads out image data stored in the image memory 24 whenever necessary and outputs the image data having been read out to the video switch 25.

The digital/analog converter 26 converts the image data stored in the image memory 24, which are constituted with digital signals, to analog signals to be used for image display at the display monitor 16, whereas the digital/analog converter 27 converts image data of maps and the like, which are constituted with digital signals stored in the image memory 15, to analog signals.

The video switch 25 superimposes an RGB screen constituted with the analog signals resulting from the conversion at the digital/analog converter 26 and an RGB screen constituted with the analog signals resulting from the conversion at the digital/analog converter 27, one on top of the other. As a result, a display image that includes icons and buttons superimposed over a map image (including an image of the subject vehicle position mark, an image of the recommended route and the like) is generated, and the display image thus generated is output to the display monitor 16. In addition, the video switch 25 outputs to the display monitor 16 an image to be brought up at the display monitor 16 to be viewed from the driver's seat side (hereafter referred to as a driver's seat-side image) and an image to be brought up at the display monitor 16 to be viewed from the passenger's seat side (hereafter referred to as a passenger's seat-side image) separately from each other. For instance, it may output a map image as the driver's seat-side image and output a map image superimposed with icon and button images as the passenger's seat-side image. Or it may output a map image as the driver's seat-side image and output a digital terrestrial broadcast image as the passenger's seat-side image.

Next, in reference to FIGS. 3A and 3B and FIGS. 4A and 4B, the display processing executed to display icons or buttons in the embodiment of the present invention is explained.

Figure 3A:
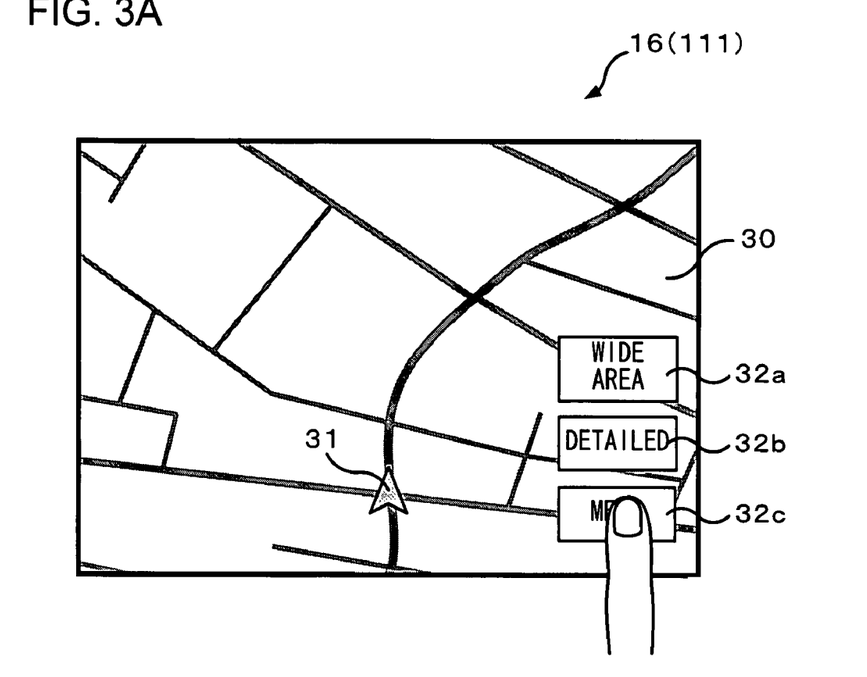
FIGS. 3A and 3B show a driver's seat-side image and a passenger's seat-side image respectively provided for the driver and the passenger while the vehicle is in a stationary state.
Figure 3B:
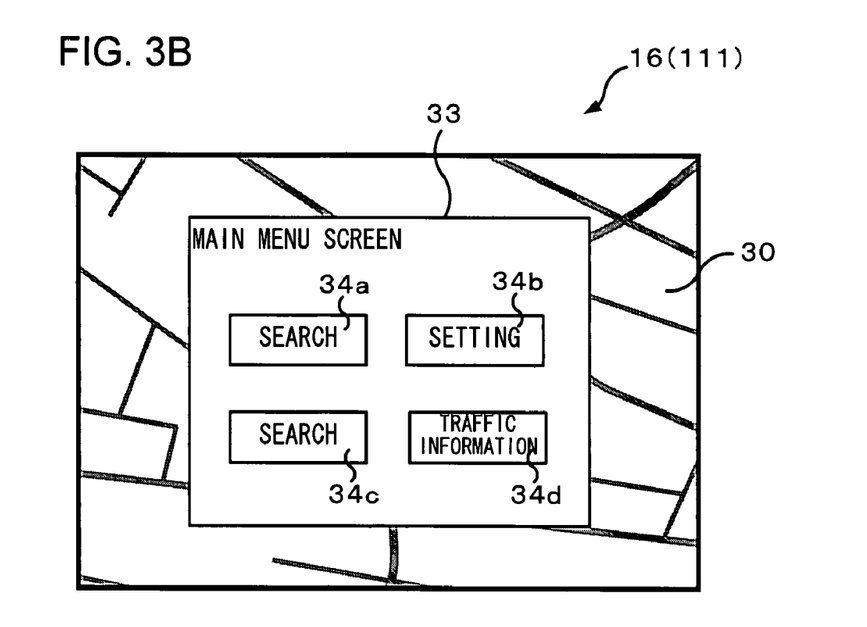

FIGS. 3A and 3B show a driver's seat-side image and a passenger's seat-side image that may be brought up on display when the vehicle is in a stationary state. When the vehicle is in the stationary state, identical map images are displayed as the driver's seat-side image and the passenger's seat-side image. As shown in FIG. 3A, a subject vehicle position mark 31 is displayed over a map 30 on display as the map image. On the right side in the map 30 on display, a wide area button 32a, to be operated to switch the display of a map 30 to a wide area map, a detailed button 32b to be operated to switch the map 30 to a detailed map and a menu button 32c to be operated to open the main menu are displayed.

If the menu button 32c is touched on the screen that can be viewed either from the driver's seat side or the passenger's seat side, a menu screen 33 such as that shown in FIG. 3B is brought up on display at the display monitor 16 so as to be viewed both from the driver's seat side and the passenger's seat side. In the menu screen 33 brought up on display, a search button 34a to be operated to search for a facility or the like to be selected as the destination, a setting button 34b to be operated to select various settings, a search button 34c to be operated to search for the recommended route and a traffic information button 34d to be operated to display traffic information are displayed.

Figure 4A:
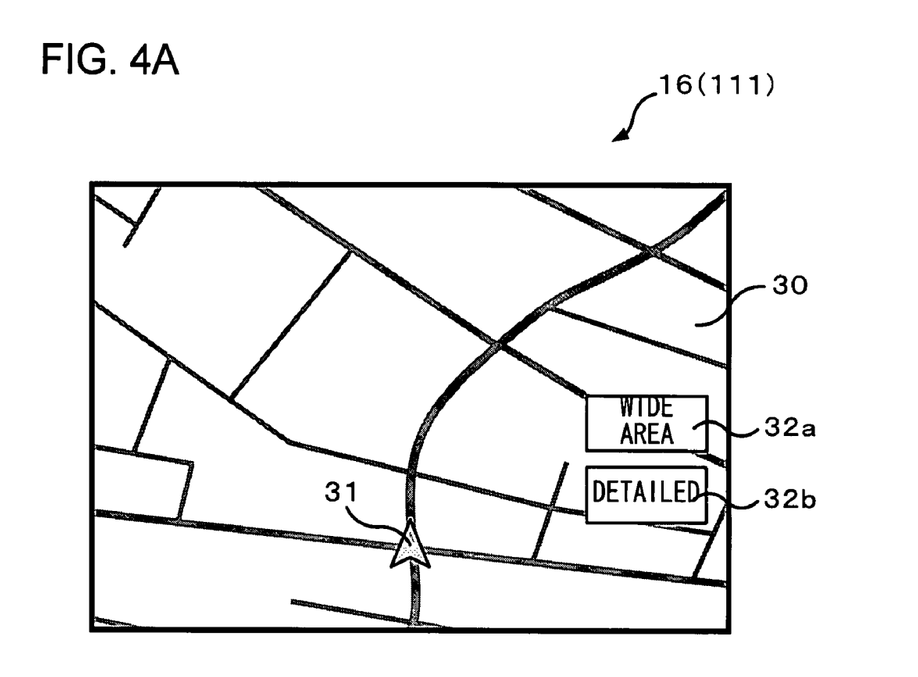
FIGS. 4A and 4B show a driver's seat-side image and a passenger's seat-side image respectively provided for the driver and the passenger while the vehicle is in motion.
Figure 4B:
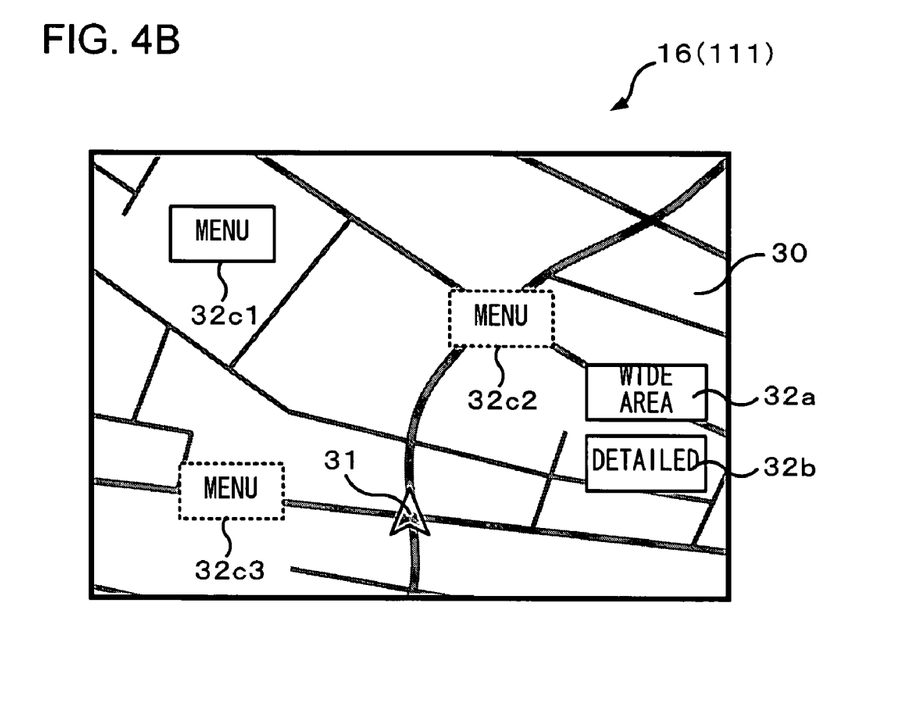

If the main menu is opened while the driver is driving the vehicle, the driver is bound to be distracted and, for this reason, access to the menu screen by the user occupying the driver's seat is restricted while the vehicle is in the traveling state. Accordingly, the menu button 32c is not displayed in the driver's seat-side image, as shown in FIG. 4A while the vehicle is in the traveling state. In the passenger's seat-side image, on the other hand, a menu button 32c1 is displayed, as shown in FIG. 4B. The display position of the menu button 32c1 is altered constantly and randomly as it moves to the display position indicated by the menu button 32c2 and then to the display position indicated by the menu button 32c3, for instance. Then, if the menu button assuming a random position among 32c1~32c3 in the passenger's seat-side image is operated, the menu screen 33 shown in FIG. 3B is brought up to be viewed as the passenger's seat-side image only.

Figure 5:
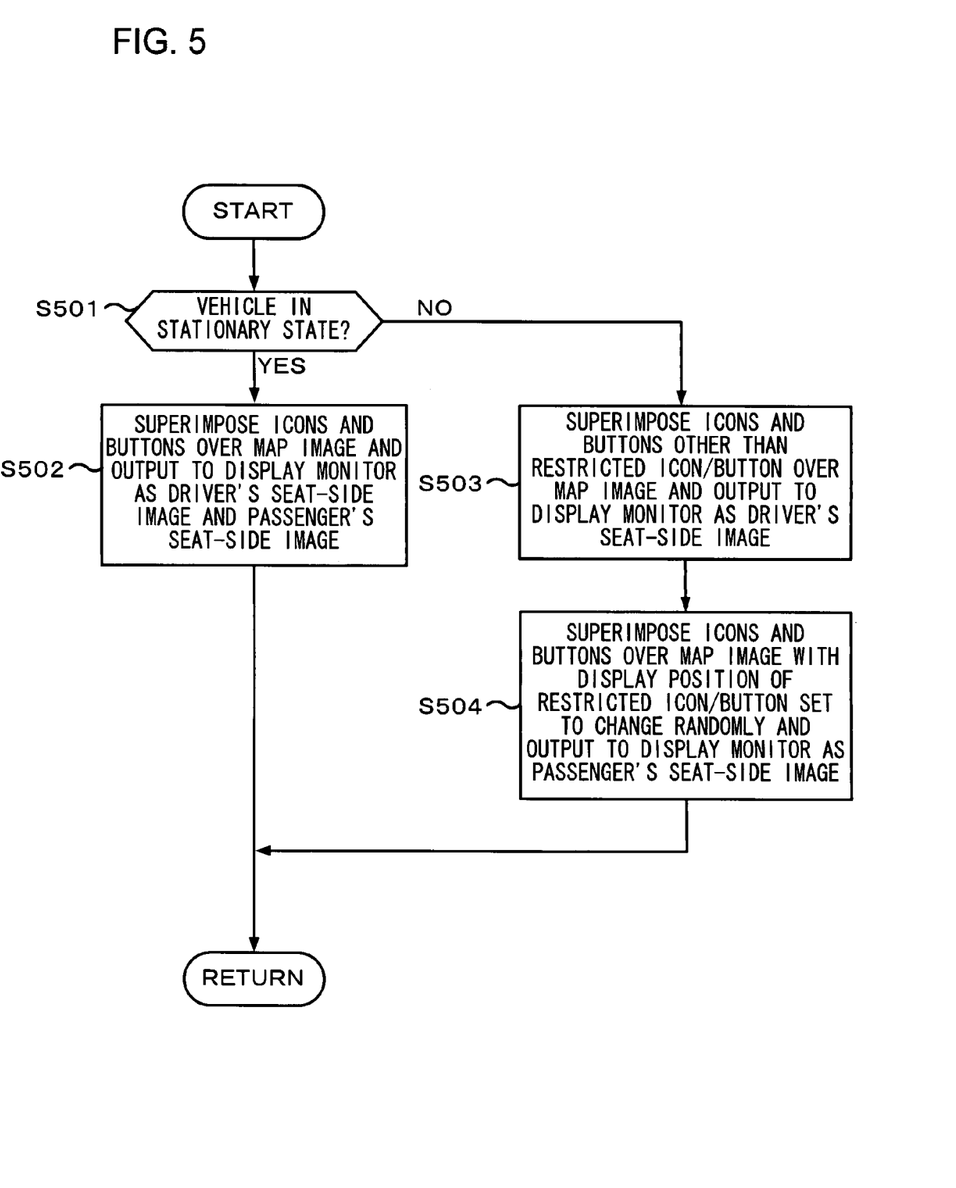
FIG. 5 presents a flowchart of the button display processing executed in the embodiment of the present invention.

Next, the button display processing executed in the embodiment of the present invention is explained in reference to the flowchart presented in FIG. 5. The processing in FIG. 5 is executed by the DCU 17 in conformance to a program started up as a button is brought up on display.

In step S501, a decision is made based upon the signal provided by the vehicle speed sensor 14b as to whether or not the vehicle is in a stationary state. An affirmative decision is made in step S501 if the vehicle is in the stationary state, and in this case, the operation proceeds to step S502. If, on the other hand, the vehicle is in motion, a negative decision is made in step S501 and the operation proceeds to step S503.

In step S502, an image that includes icons and button images superimposed over the map image is output to the display monitor 16 both as the driver's seat-side image and the passenger's seat-side image. Then, the operation makes a return.

In step S503, an image that includes images of icons and buttons other than an icon or a button the operation of which by the user occupying the driver's seat is restricted (hereafter referred to as a restricted icon/button) superimposed over the map image is output as the driver's seat-side image to the display monitor 16. In step S504, an image that includes icon and button images superimposed over the map image, with the display position of the restricted icon/button set to change randomly, is output as the passenger's seat-side image to the display monitor 16. Then, the operation makes a return.

The following advantages are realized through the navigation system 1 achieved in the embodiment described above.
(1) While the vehicle is in the traveling state, the driver's seat-side image does not contain the restricted icon/button which is still visible in the passenger's seat-side image. The display position of the restricted icon/button in the passenger's seat-side image changes constantly. In other words, the display position of the restricted icon/button in the passenger's seat-side image keeps on changing. Thus, the user occupying the driver's seat cannot memorize the display position of the restricted icon/button and cannot operate the restricted icon/button. In addition, since the change in the display position is random, the user occupying the driver's seat, who cannot guess the display position of the restricted icon/button based upon a specific pattern, cannot operate the restricted icon/button.

(2) Since a drawing circuit (DCU control circuit 21) that generates icon and button images is provided as a component independent of the drawing circuit (control circuit 11) that generates map images and the like, the constant change in the display position of an icon or button in the passenger's seat-side image does not place extra onus on the processing executed by the control circuit 11. As the result, no delay is caused in the map image display by the onus of icon/button random display processing.

The navigation system 1 achieved in the embodiment described above allows for the following variations.

(1) While the vehicle is in the traveling state, neither the driver's seat-side image or the passenger's seat-side image may include the restricted button, the operation of which by the user occupying the driver's seat is restricted under normal circumstances. Then, if an infrared sensor or a video camera detects that the hand of the user occupying the passenger's seat has moved close to the navigation system 1, the restricted button may be displayed in the passenger's seat-side image only. This alternative will provide a less distracting display for the passenger who may find it irritating to have a button or an icon displayed at a constantly changing position while the vehicle is in the traveling state.

(2) The DCU 17 in a navigation system 1 equipped with a display monitor for the front seats and a display monitor for the rear seats may display icons and buttons at different positions on the display monitor for the front seats and at the display monitor for the rear seats, so as to assure better user convenience, since the display positions at which the icons and the buttons can be touched by the users in the front seats and the users in the rear seats are different.

(3) The present invention may be adopted in on-vehicle display devices other than an on-vehicle display device in the navigation system 1.

The above described embodiment is an example and various modifications can be made without departing from the spirit and scope of the invention.

What is claimed is:

1. An on-vehicle navigation device, comprising:
    an image generation unit that generates a first image that can be viewed from a driver's seat side and a second image that can be viewed from a passenger's seat side;
    a display monitor at which the first image and the second image are displayed within a screen; and
    a decision unit that makes a decision whether a vehicle is in a stationary state or in a traveling state, wherein:
    the image generation unit includes:
        a first image generation unit that generates a map image,
        a second image generation unit that is provided separately from the first image generation unit and generates an image of an icon or a button, and
        a superimposing unit that is configured to superimpose the image of the icon or the button generated by the second image generation unit over the map image generated by the first image generation unit,
    the second image generation unit generates an image of a restricted icon or a restricted button, wherein the operation of the restricted icon or the restricted button by the driver is restricted while the vehicle is in the traveling state,
    when the decision unit makes a decision that the vehicle is in the traveling state, the superimposing unit outputs the map image generated by the first image generation unit as the first image without superimposing the image of the restricted icon or the restricted button generated by the second image generation unit, and outputs the map image generated by the first image generation unit as the second image with superimposing the image of the restricted icon or the restricted button generated by the second image generation unit while a display position of the restricted icon or the restricted button is constantly changed in the second image,
    when the decision unit makes a decision that the vehicle is in the stationary state, the superimposing unit outputs the map image generated by the first image generation unit as the first image and the second image with superimposing the image of the restricted icon or the restricted button generated by the second image generation unit while a display position of the restricted icon or the restricted button is not constantly changed in the first image or the second image.

2. An on-vehicle navigation device according to claim 1, wherein:
    when the vehicle is in the traveling state, the second image generation unit changes the display position of the restricted icon or the restricted button randomly.

3. An on-vehicle navigation device according to claim 1, wherein:
    the restricted icon or the restricted button is a menu button operated to display a menu screen.

4. An on-vehicle navigation device according to claim 1, wherein:
    the superimposing unit outputs the map image generated by the first image generation unit as the first image and the second image with superimposing an image of an unrestricted icon or an unrestricted button, which is generated by the second image generation unit such that the operation of the unrestricted icon or the unrestricted button by the driver is not restricted.

5. An on-vehicle navigation device according to claim 4, wherein:
    the restricted icon or the restricted button is a menu button operated to display a menu screen and the unrestricted icon or the unrestricted button is a button to be operated to indicate a wide area or detailed setting for the map image.

6. An on-vehicle navigation device according to claim 1, wherein:
    a touch panel that forms a touch switch by interlocking with a displayed icon or a displayed button is disposed over a display screen at the display monitor.

7. An on-vehicle navigation device according to claim 1, further comprising: a detection unit that is configured to detect whether or not a hand of a user has moved close to the navigation device; wherein: when the detection unit fails to detect that a hand of a user has moved close to the navigation device even if the decision unit makes a decision that the vehicle is in the traveling state, the superimposing unit outputs the map image generated by the first image generation unit as the second image without superimposing the image of the restricted icon or the restricted button generated by the second image generation unit and when the detection unit detects that a hand of a user has moved close to the navigation device and the decision unit makes a decision that the vehicle is in the traveling state, the superimposing unit outputs the map image generated by the first image generation unit as the second image with superimposing the image of the restricted icon or the restricted button generated by the second image generation unit.

* * * * *